United States Patent [19]

Brenner et al.

[11] 4,221,887
[45] * Sep. 9, 1980

[54] PLASTICIZATION OF QUATERNARY PHOSPHONIUM ION CONTAINING POLYMERS

[75] Inventors: Douglas Brenner, Livingston; Alexis A. Oswald, Mountainside, both of N.J.

[73] Assignee: Exxon Research & Engineering Co., Florham Park, N.J.

[*] Notice: The portion of the term of this patent subsequent to Jul. 25, 1995, has been disclaimed.

[21] Appl. No.: 924,968

[22] Filed: Jul. 17, 1978

Related U.S. Application Data

[63] Continuation-in-part of Ser. No. 788,312, Apr. 18, 1977, Pat. No. 4,102,876.

[51] Int. Cl.$^2$ .................... C08G 75/00; C08L 19/00
[52] U.S. Cl. .................................. 525/332; 525/333; 525/334; 525/335; 525/340; 525/341
[58] Field of Search .................... 526/19, 20, 21, 22, 526/30, 40; 525/332, 333, 334, 335, 340, 341

[56] References Cited

U.S. PATENT DOCUMENTS

| | | | |
|---|---|---|---|
| 2,764,563 | 9/1956 | McMaster et al. | 260/2.2 R |
| 3,055,729 | 9/1962 | Richter et al. | 260/2.2 R |
| 3,208,984 | 9/1965 | Dekking | 260/2.1 R |
| 3,235,536 | 2/1966 | Garner | 260/2 P |
| 3,235,591 | 2/1966 | Goodrow | 260/2 P |
| 3,577,357 | 5/1971 | Winkler | 260/2.2 R |
| 3,821,137 | 6/1974 | Lishevskaya et al. | 260/2.2 R |
| 3,839,237 | 10/1974 | Battaerd et al. | 260/2.1 R |
| 3,867,319 | 2/1975 | Lundberg | 260/30.6 R |
| 3,929,849 | 12/1975 | Oswald | 260/448 C |
| 3,947,387 | 3/1976 | Lundberg | 521/150 |
| 4,007,149 | 2/1977 | Burton et al. | 526/40 |
| 4,014,831 | 3/1977 | Bock et al. | 260/23 AR |
| 4,102,876 | 7/1978 | Brenner et al. | 526/19 |

*Primary Examiner*—Ronald W. Griffin
*Attorney, Agent, or Firm*—Richard E. Nanfeldt

[57] ABSTRACT

Polymers comprising quaternary phosphonium counter-ion salts of acids having anionic groups covalently bonded to carbon atoms comprising a backbone chain of a polymer, or to acrylic, alicyclic or aromatic radicals which are pendant to the backbone chain of the polymer are novel compositions of matter. Such polymers vary in properties from water-soluble polyelectrolytes useful as thickening agents to thermoplastic elastomers which can be extruded, injection molded, vacuum formed, etc. at elevated temperatures. The elastomeric ionomers are useful as specialty and general purpose rubbers. The ionomers of the instant invention are plasticized with a select group of plasticizers thereby improving the rheological properties of the ionomers.

31 Claims, No Drawings

PLASTICIZATION OF QUATERNARY PHOSPHONIUM ION CONTAINING POLYMERS

CROSS-REFERENCE TO RELATED APPLICATIONS

This instant application is a CIP application of Ser. No. 788,312 filed Apr. 18, 1977, now U.S. Pat. No. 4,102,876, issued July 25, 1978.

BACKGROUND OF THE INVENTION

1. Field of the Invention

This invention relates to ionic polymers. More particularly, this invention relates to the plastization of quaternary phosphonium salts of anionic polymers, i.e. polymers containing covalently bound negatively charged groups. Most particularly, this invention is concerned with novel compositions of matter comprising plasticized quaternary phosphonium salts of polymers having incorporated therein one or more covalently bonded anionic radicals selected from the group consisting of sulfonic, carboxylic and phosphonic acid radicals.

The ionic salts from which the plasticized compositions of this invention are derived may be schematically represented, for the case where the anionic group is a sulfonic acid radical as follows:

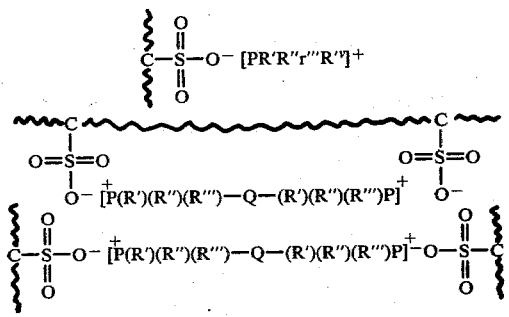

wherein ∿C∿ is a carbon atom comprising the polymer backbone chain of carbon atoms or is in an acyclic, alicyclic, or aromatic radical which is pendant to the backbone chain and wherein said ∿C∿ is (1) in a single polymer molecule, (2) in the same polymer molecule, and (3) in different polymer molecules; $R'$, $R''$, $R'''$ and $R'^v$ are independently selected from the group consisting of $C_1$ to $C_{50}$ straight and branched chain acyclic, alicyclic, aryl, alkylaryl and arylalkyl radicals and substituted functional derivatives thereof; and Q is selected from the group consisting of $C_1$ to $C_{40}$ divalent straight and branched chain alkylene, cycloalkylene, arylene, dialkylene-arylene radicals and substituted functional derivatives thereof and $-(CHY)_n-Z_m-(CHY)_n-$ where Z is a hetero atom selected from the group consisting of oxygen and sulfur, m is zero or one, Y is hydrogen or said $C_1$ to $C_{50}$ radicals or substituted functional derivatives of said radicals and n is an integer of from 1 to 10.

While the mono and divalent quaternary phosphonium salts of anionic polymers shown in the above formulae are preferred for the practice of this invention, this invention may also be utilized with polyvalent quaternary phosphonium salts of anionic polymers wherein the polyvalent phosphonium cations have the general formulae:

$$[R'R''R'''P^+\!+\!Q\!-\!(R')P^+(R'')\!+\!Q\!+\!P^+R'R''R''']\qquad 4.$$

wherein $R'$, $R''$, $R'''$ and Q have the same value and significance as in formulas 2 and 3 above; and $$T[PR'R''R''']_v^+ \qquad 5.$$

wherein v is the valency of a polyvalent hydrocarbon radical T, and $R'$, $R''$ and $R'''$ have the same value and significance as $R'$, $R''$, $R'''$ and $R'^v$ in the above formulas, v is 3 to 10, preferably 3 or 4.

T is selected from the group consisting of $C_4$ to $C_{40}$ polyvalent organic radicals. T is preferably aliphatic, more preferably a saturated aliphatic polyvalent hydrocarbyl radical or a substituted functional derivative thereof. Most preferably T is a $C_4$ to $C_{12}$ polyvalent alkyl radical.

Using sulfonated polymers as a preferred example of the anionic polymers which are plasticized in this invention, the ionically cross linked ionomers are readily prepared from the free-sulfonic acid form by direct neutralization, either in bulk or in solution, with a quaternary phosphonium hydroxide, or by double decomposition (metathesis) of a cationic salt of the sulfonic acid with a quaternary phosphonium salt of an acid which is weaker (i.e. has a lower $K_a$) than the sulfonic acid, or by double decomposition in a multiphase fluid medium in which the salt of the displaced counterion is selectively removed from the phase containing the polymer to a phase in which the phosphonium ionomer is substantially insoluble.

The properties and utility of the plasticized ionic salts of this invention vary over a wide range depending on the choice and concentration of the plasticizer, the structure of the anionic polymer, the average molecular weight and molecular weight distribution, the degree of neutralization of the anionic groups in the polymer, the mole concentration of the quaternary phosphonium salt groups in the polymer, and the type and variety of the substituents attached to the phosphorus. The ionic salts may vary from water-soluble polyelectrolytes useful as adhesives and thickening agents to elastomers or hard resins which are thermoplastic at elevated temperatures permitting the products to be extruded, injection molded, vacuum formed and sheeted.

The plasticizers for the ion-containing polymers of the instant invention are preferably selected from the group consisting essentially of organic ureas, organic thioureas, organic amides and organic amines and mixtures thereof.

A particularly useful form for a plasticized ionomer is an elastomer (water-insoluble) which can be melt fabricated and then used without curing, and which can be reprocessed at elevated temperature since it does not contain permanent covalent crosslinks.

2. Prior Art

Anionic polymers and their salts, prepared either by covalently appending anionic groups to a preformed polymer, as for example, by sulfonation or grafting of anionic monomers, or prepared by the mono or interpolymerization of monomers having acid moieties are old in the art but no references in the patent or general chemical literature have been found disclosing quaternary phosphonium salts of anionic polymers. A recently published book, "Ionic Polymers", L. Holliday, Editor, John Wiley & Sons, New York, New York, 1975 reviews the field and describes a variety of anionic polymers suitable for the preparation of the quaternary phosphonium salts of this invention. A comprehensive survey of ionomers has been filed in copending application No. 855,553.

SUMMARY OF THE INVENTION

This invention describes the preparation, and utility of novel plasticized ionic polymers comprising quaternary phosphonium salts of polymers having one or more anionic groups covalently bonded to a carbon atom comprising the polymer. Preferred plasticizers are organic ureas, organic thioureas, aliphatic organic amides and organic amines. Preferred anionic groups are sulfonic acid, carboxylic acid and phosphonic acid groups.

DESCRIPTION OF THE PREFERRED EMBODIMENTS

Anionic polymers which are particularly suitable for the preparation of the plasticized quaternary phosphonium ionomers of this invention may be broadly divided into those polymers having:

I. One or more sulfonic acid groups covalently linked to one or more carbon atoms comprising the polymer molecule; and II. One or more carboxylic acid groups covalently linked to one or more carbon atoms comprising the polymer molecule.

I. Sulfonic Acid Polymers

Polymers having sulfonic acid groups covalently bonded to carbon atoms comprising the polymer can be prepared by the sulfonation of a preformed hydrocarbon polymer by sulfonation or grafting reagents, or by the homopolymerization or interpolymerization of a monomer incorporating a sulfonic acid group or salt of a sulfonic acid. As used herein the term "interpolymer" denotes a polymer comprising more than one monomer, e.g. copolymer, terpolymer, etc. in which the arrangement of the monomer moieties may be random, alternating, block, graft, stereoregular and the like. Suitable non-limiting examples are grouped as follows:

A. Pre-Formed Polymers a. Homopolymers and interpolymers of one or more acyclic and alicyclic mono-olefins in which the polymers are essentially free of unsaturation (except for chain-end unsaturation) prepared with the aid of cationic, free-radical, anionic, or Ziegler-Natta catalysts. Non-limiting examples include homopolymers and interpolymers of $C_2$ to $C_{18}$ olefins such as ethylene, propylene, isobutene, butene-1, pentene-1, hexene-1, 4-methylpentene-1, cyclopentene, bicyclo(2,2,1) 2-heptene, dodecene-1 and octadecene-1. Commercially available polymers in this group are polyethylene, polypropylene, ethylene-propylene rubber (EPR) and polyisobutylene.

b. Hompolymers and interpolymers of one or more alkenyl aromatic hydrocarbon monomers and substituted derivatives thereof having the general formulae Ar—C(R)=CHR' and Ar—CHR—CH=CH$_2$ wherein Ar is a monovalent sulfonatable aromatic radical and R and R' are independently selected from the group consisting of hydrogen and a methyl radical. Non-limiting examples of monomers which can be polymerized with the aid of a variety of catalyst systems to yield polymers which are suitable for the practice of this invention include: styrene, α-methyl styrene, propenyl benzene, allyl benzene, vinyl toluene, vinyl naphthalene and vinyl ethylbenzene.

c. Interpolymers of one or more $C_4$ to $C_{10}$ conjugated diolefins with one or more $C_8$ to $C_{12}$ vinyl aromatic hydrocarbons. Non-limiting examples include: copolymers of 1,3-butadiene with styrene, e.g. SBR rubber and graft polymers of styrene on polybutadiene.

d. Random interpolymers of one or more $C_8$ to $C_{12}$ vinyl aromatic hydrocarbons comprising about 40 to 60 weight percent of the vinyl aromatic with one or more $C_4$ to $C_{10}$ Type III mono-olefins. Non-limiting examples include the PARAPOL S resins comprising interpolymers of styrene and isobutylene.

e. Random elastomeric interpolymers of one or more $C_4$ to $C_{10}$ conjugated diolefins with one or more $C_4$ to $C_{10}$ Type III mono-olefins. Non-limiting examples include the family of BUTYL rubbers comprising interpolymers of isobutylene with butadiene, isoprene, piperylene, 1,3-hexadiene, 2,3-dimethyl-1,3-butadiene and cyclopentadiene.

f. Homopolymers and interpolymers of one or more $C_{10}$ acyclic and alicyclic monoterpenes and $C_{15}$ sesquiterpenes prepared with the aid of cationic, Ziegler-Natta and free-radical (e.g. gamma radiation) catalysts. Non-limiting examples of suitable monomers include: β-pinene, dicyclopentadiene, vinyl cyclohexene, dipentene, myrcene, ocimene and β-farnesene.

g. Homopolymers and interpolymers of one or more $C_4$ to $C_{10}$ conjugated diolefins. Non-limiting examples of suitable monomers include: 1,3-butadiene; isoprene; piperylene; 2,3-dimethyl buta-1,3-diene; and cyclopentadiene. Enchainment, using a variety of catalysts for the polymerization, e.g. alkali metal anionic and Ziegler-Natta catalysts includes 1,4-cis; 1,4-trans; 1,2- and 3,4-types of addition and random mixtures thereof. Non-limiting examples of commercially available polymers include: natural rubber and synthetic cis-1,4-polybutadiene and cis-1,4-polyisoprene.

h. Random interpolymers of one or more Type I $C_2$–$C_{18}$ mono-olefins and one or more $C_6$ to $C_{12}$ acyclic or alicyclic non-conjugated diolefins. Non-limiting examples of commercially available EPDM polymers include: terpolymers of ethylene, propylene and 1,4-hexadiene (NORDEL); terpolymers of ethylene, propylene and 5-ethylidene-2-norbornene (VISTALON) and ethylene, propylene and dicyclopentadiene (DUNLOP).

Olefin types are in accordance with the Schmidt and Boord Classification, J.A.C.S. 54, 751 (1932).

B. Polymers from Monomers Incorporating Sulfonic Acids

While the range and variety of monomers which incorporate sulfonic acid groups or their salts is not large at the present time, the use of these monomers permit the preparation of a variety of homopolymers and interpolymers that cannot be easily prepared by direct sulfonation of preformed polymers. Non-limiting examples of monomers incorporating sulfonic acids or their salts include: vinyl sulfonic acid; allyl sulfonic acid; methallyl sulfonic acid; 2-allyl oxyethane sulfonic acid; 2-hydroxy-3-allyl oxy propane sulfonic acid and styrene sulfonic acid. Vinyl sulfonic acid readily forms a water-soluble homopolymer and interpolymers with acrylonitrile, acrylic acid amide, vinyl acetate, acrylic acid esters, and N-vinyl pyrrolidone, using a variety of catalyst systems. Styrene sulfonic acid readily polymerizes to yield a water-soluble polymer. The above monomers or their salts are preferably interpolymerized with hydrocarbons, to provide the polymeric sulfonic acids or their salts. The use of phosphonium sulfonate monomers directly provide the novel compositions of this invention.

C. Sulfonation of Pre-Formed Polymers

Processes for the sulfonation of hydrocarbon polymers which are: (a) essentially free of olefinic unsaturation except for chain-end unsaturation, or (b) possess a measurable degree of olefinic unsaturation which may be in the polymer backbone chain of carbon atoms or is in an acyclic alkenyl or alkylidene radical or alicyclic radical which is pendant to the backbone chain of carbon atoms, or (c) possess aryl or arylene radicals which comprise the backbone chain of carbon atoms or are pendant to the backbond chain of carbon atoms are old in the art.

Polymers which are free of unsaturation but have a measure of chain branching such as polyethylene, polypropylene, polyisobutylene and EPR rubbers may be sulfonated in solution by means of $SO_2$ and $O_2$ with the aid of a free-radical initiator (sulfoxidation reaction), or sulfochlorinated in solution by means of $SO_2$ and $Cl_2$ with the aid of a free-radical initiator (Reed reaction) followed by hydrolysis of the sulfonyl chloride to the free sulfonic acid or a salt of the sulfonic acid, or by means of complexes or coordination compounds of $SO_3$ with Lewis bases such as triethyl phosphate as disclosed in U.S. Pat. No. 3,205,285 which is herein incorporated by reference. The same reagent has been disclosed in U.S. Pat. Nos. 3,072,618 and 3,072,619 for the sulfonation of polystyrene and in U.S. Pat. No. 3,432,480 for the sulfonation of cis-1,4-polybutadiene. The above three patents and U.S. Pat. No. 3,642,728 which discloses a variety of complexing agents for the sulfonation of non-aromatic polymers such as BUTYL rubber are hereby incorporated by reference. U.S. Pat. No. 3,836,511 which discloses the sulfonation of unsaturated elastomers using acetyl sulfate is also incorporated by reference.

The sulfonations are carried out in solution in an inert hydrocarbon solvent such as hexane, heptane or isooctane, or chlorinated solvents such as ethylene dichloride or chlorobenzene at temperatures in the range of about $-40°$ C. to $100°$ C. depending on the reactivity of the sulfonation reagent employed.

Polymers suitable for the practice of the present invention can possess a wide range of concentrations of anions. They may contain as much as one anionic group per monomer unit or as little as one anionic group per 1000 monomer units. Preferably there should be from 2 to 80 anionic groups per 1000 monomer units. This means that the concentration of ionic groups based on the monomer units of the polymer is from about 0.1 to about 100 mole percent, preferably about 0.2 to about 8 mole percent.

The strength of ionic interactions among the ionic groups of the present polymers and between such ionic groups and water, for example, depends in large part on the concentration of the ionic groups in the polymer, as well as on the type and concentration of plasticizer present. The concentration of ionic groups and the presence or absence of higher alkyl substituents on the quaternary counter-ions can determine whether such polymers are water soluble on the one hand or whether they can be readily melt-fabricated on the other.

For example, sulfonated polymers suitable for the practice of this invention may have sulfur contents as high as 29.7 wt. % in the case of a homopolymer of vinyl sulfonic acid or $\sim 17.2$ wt. % in the case of a homopolymer of styrene sulfonic acid and as low as 0.1 wt. % in the case of a sulfonated polyisobutylene or polypropylene. Ionomers which are melt fabricated are most useful when they have a concentration or ionic groups which is between 0.2 and 8 mole percent (based on the monomer units of the polymer) since at concentrations below 0.2 mole percent the effect of the ionic groups on the physical properties tends to be slight, while above 8 mole percent the ionomer tends to become difficult to melt fabricate. The sulfonated polymer may be purified and recovered as the free acid or neutralized with a basic compound such as ammonium hydroxide or methyl amine. Conversion of the free sulfonic to the quaternary phosphonium salt is readily obtained in solution by neutralization at a temperature in the range of about $0°$ to $50°$ C. with a quaternary phosphonium hydroxide. Where the sulfonic acid has been previously neutralized with a base, it may be exchanged for the quaternary phosphonium cation if the base is weaker than the quaternary hydroxide, or an acid salt of the quaternary phosphorus compound can be used if the acid is weaker than the sulfonic acid.

II. Carboxylic Polymers

A wide variety of polymers having one or more carboxylic acid groups covalently linked to carbon atoms comprising the polymer which are suitable for the preparation of the quaternary phosphonium ionomers of this invention have been described in the patent and general chemical literature. Carboxylic polymers particularly useful for the preparation of ionically cross-linked elastomers have been reviewed in "Ionic Polymers", referenced above and by Brown et al; Rubber Chem. & Technol., 28, 937 (1955); Boguslavskii; Soviet Rubber Technol., 18, 4 (1959); and Brown; Rubber Chem. & Technol., 36, 931 (1963). Non-limiting examples of useful polymers include interpolymers of acrylic and methacrylic acids with olefins and conjugated diolefins.

III. Quaternary Phosphonium Counterions

The preparation of halide salts and hydroxides of quaternary phosphonium compounds having the general formulae:

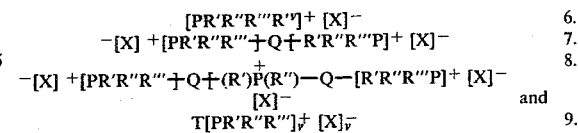

wherein R', R", R''', and R'$^v$ are independently selected from the group consisting of $C_1$ to $C_{50}$ straight and branched chain acyclic, alicyclic, aryl, alkylaryl and arylalkyl radicals and substituted functional derivatives thereof; Q is selected from the group consisting of $C_1$ to $C_{40}$ divalent straight and branched chain alkylene, cycloalkylene, arylene, dialkylene arylene radicals and substituted functional derivatives thereof and $-(CHY)_n-Z_m-(CHY)_n$ wherein Z is a heteroatom selected from the group consisting of oxygen and sulfur, m is zero or one, Y is hydrogen or said $C_1$ to $C_{50}$ radicals and substituted functional derivatives of said radicals, n is an integer from 1 to 10; v is the valency of a polyvalent radical T; and $[X]^{31}$ is an anion selected from the group consisting of $OH^-$, $Cl^-$, $Br^-$ and $I^-$, are old in the art. The valency of T is 3–10, preferably 3 or 4. Mono and divalent hydrocarbyl groups and their substituted functional derivatives are defined in U.S. Pat. No. 3,929,849, herein incorporated by reference, and non-limiting examples of polyvalent radical (T above) are illustrated by $CH_3C(CH_2)_3$, $HOCH_2C(CH_2)_3$, and $C(CH_2)_4$.

A partial list of quaternary phosphonium compounds which are suitable for the practice of this invention and general methods for their preparation is given in "Organo Phosphorus Compounds", G. M. Kosalapoff, John Wiley & Sons, New York, 1950 and in Organic Phosphorus Compounds, Vol. 2, Kosalapoff et al eds., John Wiley & Sons, New York, 1972. The preparation of novel quaternary phosphonium halides is disclosed in U.S. Pat. Nos. 3,929,849 and 3,998,754 which are herein incorporated by reference.

IV. Product Composition, Properties and Utility

The products of the instant invention were characterized by the general formulas (1), (2), (3), (4) and (5) which were described above. Such polymers range in properties from water-soluble polyelectrolytes useful as thickening agents to thermoplastic elastomers which can be extruded, injection molded, vacuum formed, etc. at elevated temperatures. The elastomers are useful as specialty and general purpose rubbers.

Products which have a limited concentration of anionic groups covalently bonded to one or more of the carbon atoms comprising the polymer, when neutralized or partially neutralized with metal cations, are generally referred to as ionomers. The acidity of the unneutralized anionic polymer may vary over a wide range; useful acidities being in the range from 0.1 to 200 milliequivalents of hydrogen per 100 grams of the anionic polymer. Such ionomers, when neutralized or partially neutralized with the quaternary phosphonium cations specified in the instant invention (rather than with metal cations) and plasticized with the specified plasticizing agents are a preferred embodiment of this invention. In particular, such plasticized ionomers when based on an elastomeric backbone have application as thermoplastic elastomers.

The ionomeric products of the instant invention are plasticized compositions which are formed by the combination of a specified plasticizer or mixture containing specified plasticizer with an ion-containing polymer having the following general formulae:

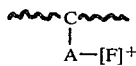

wherein ~C~ is one or more carbon atoms in one or more molecules comprising a polymer; $A^-$ is one or more anionic acid radicals selected from the group consisting of sulfonic, carboxylic and phosphonic acids covalently bonded to one or more of said ~C~ carbon atoms; and $[F]^+$ is one or more of the mono or polyvalent quaternary phosphonium cations selected from the group of counterions defined in Formulas 6 to 9 inclusive, above.

V. Plasticization of Quaternary Phosphonium Neutralized Polymers

The plasticization of the ionomers of the instant invention improve the rheological properties of the ionomers of the instant invention.

The plasticizers of the instant invention are preferably selected from the group consisting essentially of organic ureas, organic thioureas, organic amides, and organic amines and mixtures thereof.

Useful plasticizers for the quaternary phosphonium ionomers of this invention are polar organic non-hydrocarbon compounds in the $C_1$ to $C_{50}$ range which preferably contain at least one heteroelement selected from the group consisting of O, S, N and P beside carbon and hydrogen. The preferred polar plasticizers are amphiphilic in character, i.e. they possess at least one lipophilic (oil soluble) and at least one hydrophilic (water soluble) group in the plasticizer molecule. The preferred lipophilic group of the present amphiphilic plasticizers is a $C_6$ to $C_{50}$ hydrocarbyl, preferably alkyl, more preferably n-alkyl group. The preferred hydrophilic moiety is selected from the group consisting of acidic groups, basic groups, salt groups, hydrogen bonded complex groups, amide groups, polyethylene oxide groups, ester groups, keto groups, and hydroxy groups.

As such the amphiphilic plasticizers can be represented by the formula

wherein L is the lipophilic, H is the hydrophilic moiety, both as defined above. The symbols a and b represent whole numbers ranging from one to four.

The preferred plasticizers appear to selectively interact with the phosphonium salt groups of the present polymers. Furthermore it is more preferred that this interaction be dependent on the temperature and should mainly occur at processing temperatures e.g. for melt extrusion.

A preferred method of achieving preferential high temperature plasticization comprises the use of plasticizers that are solid at ambient temperatures but melting below processing temperatures. For reduced plasticization i.e. sustained physical properties in a broad range of lower temperatures, the melting point of such plasticizers should not be far below the processing temperature range.

Exemplary hydrocarbyl substituents of the present plasticizers include open chain and cyclic aliphatic groups of saturated and unsaturated character and aryl, alkylaryl, aralkyl and alkylaralkyl groups. Specific examples of such groups include methyl, hexyl, tetracontyl, oleyl, cyclohexyl, dodecylcyclohexyl, decahydronaphthalyl, octynyl, abietyl, phenyl, naphthyl, benzyl, dodecylbenzyl, octadecylxylyl, t-butylnaphthyl, tetrahydrodecalyl.

Exemplary hydrophilic groups of the present plasticizers include acidic groups such as carboxylate, phosphite, phosphate, phosphonate, sulfonate. However, such groups are not to include acids stronger than the parent acid of the polymeric phosphonium salt which is plasticized. More preferred acid groups consist of carboxylate and phosphite. The carboxylate is the most preferred.

Exemplary hydrophilic basic groups of the present plasticizers include amine groups, ureido groups, amine oxide groups, phosphine oxide groups. The amine and ureido groups are preferred.

Exemplary salt and/or hydrogen bonded complex groups of hydrophilic character include quaternary phosphonium salts and amine and urea complexes. For example quaternary phosphonium carboxylate salts, amine-carboxylic acid and urea carboxylic acid complexes are useful.

Esters of hydrophylic character include carboxylates, phosphites, phosphates and phosphonates. Carboxylates are preferred.

Similarly, hydrophilic amide groups are preferably derived from carboxylic, sulfonic, phosphoric and phosphonic acids. Carboxamides are more preferred.

Specific examples of the present plasticizers are listed in the following.

Stearic acid, lauric acid, octylbenzoic acid, phthalic acid, phenylacetic acid, naphthoic acid, diphenyl phosphite, dihexyl phosphoric acid, dodecyl benzene sulfonic acid, dodecenyl succinic acid, adipic acid, behenyl amine, didecyl amine, trioctyl amine, naphthyl amine, diamino naphthalene, amino naphthol, arachidyl amine, didecyl hydroxyethyl amine, dodecyl urea, tetramethyl thiourea, phenylurea, tridodecyl amine oxide, triphenyl phosphine oxide, tetramethyl ethylene diamine, tetraphenyl phosphonium acetate, hexamethyl ethylene bis-phosphonium dibenzoate, dodecylbenzene sulfonic acid urea complex, ammonium naphthyl carbamate, stearyl amine acetic acid complex, acetamide, stearyl amide, dodecyl benzene sulfonamide, dimethyl behenamide, N-lauryl benzamide, naphthoic acid amide, dodecylphosphonic acid diamide, hexaoctyl phosphoramide, N,N-dibutyl succinamide, phthalimide, ethyl stearate, behenyl acetate, dioctyl phthalate, trilauryl phosphite, tritolyl phosphate, diethyl chloroethyl phosphonate, glyceryl stearate, trioctyl trimellitate, tetraethoxylated lauryl alcohol, hexaethoxylated dinonyl phenol, octadecyl methyl ketone, dodecyl acetophenone, arachidyl alcohol, dodecyl phenol, dodecyl guanidine.

A preferred class of the present plasticizers is represented by the formula:

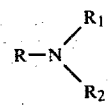

wherein R and $R_1$ are hydrogen, a $C_1$ to $C_{50}$ hydrocarbyl, preferably alkyl or aryl; and wherein $R_2$ is hydrogen; a $C_1$ to $C_{50}$ hydrocarbyl, preferably alkyl or aryl; acyl, preferably carboxylic acid derived; carbamido; thiocarbamido; or guanidino.

The above acyl group is preferably of the formula:

wherein $R_3$ is chosen from the group listed above for $R_1$ and $R_2$.

The carbamido group referred to above is preferably of the formula:

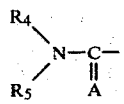

wherein $R_4$ and $R_5$ are chosen from the groups listed above for $R_1$ and $R_2$, but most preferably hydrogen, A is S, O, or N—H.

The amount of the plasticizer used in the quaternary phosphonium ionomers mainly depends on the specific plasticizer and phosphonium ionomer used and on the desired processing and use properties of the plasticized phosphonium ionomer. Certain phosphonium ionomers are effectively plasticized with lesser amounts of the plasticizer. Certain plasticizers are effective at lower concentration than others in the same phosphonium ionomer. Minimum amounts of liquid plasticizers can be used to minimize their adverse effects on physical strength of the ionomer at use temperatures. High concentrations of the same plasticizer can be used to maximize its beneficial effects on the rheological properties of the ionomer at processing temperatures, however, excessive amounts of some plasticizers can result in separation of part of the liquid from the polymer phase at processing temperatures. The optimum plasticizer concentration also depends on the choice of the processing temperature, method of fabrication and equipment utilized. These factors are considered in a fashion obvious to a person of average experience to routinely determine the effective concentration for the plasticization of the instant quaternary phosphonium ionomers with the plasticizers of the present invention. However, it is usually preferred to use the present plasticizers in phosphonium ionomers at the 0.1 to 200 phr level. The increasingly preferred plasticizer ranges are approximately 1 to 75 phr, 8 to 50 phr and 10 to 30 phr.

Preferred amides for the practice of this invention are those with the general structure:

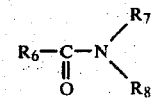

wherein in one instance $R_6$ is H or a $C_1$ to $C_{50}$ hydrocarbyl, preferably alkyl, more preferably a long, preferably straight chain aliphatic radical containing from about 6 to about 50 carbon atoms and $R_7$ and $R_8$ are independently selected from the groups H, an alkyl group, an aryl group or an aralkyl group such as methyl, butyl, stearyl, behenyl, cyclohexyl, phenyl, tolyl and benzyl. $R_6$ may be unsaturated or contain some branching, but it is most preferably linear and saturated. When in another instance $R_7$ or $R_8$ or both are long chain saturated aliphatic groups it is of less importance that $R_6$ be a long chain aliphatic radical but can be H, an alkyl group, aryl group or aralkyl group. Alternatively, when $R_7$ is H, $R_8$ can be an organic amide radical having the formula:

wherein X is selected from the group consisting of $-(CH_2)_n$ or phenylene $(C_6H_4)$ wherein n 1, and $R_9$ is a long aliphatic radical containing from about 6 to about 50 carbon atoms and is preferably linear and saturated. A typical example of such an alkylene-bis amide is ethylene-bis-stearamide.

The higher molecular weight saturated fatty acid amides such as stearamide, arachidamide, behenamide, N-methylstearamide, ethylene-bis-stearamide, and N-phenylstearamide are readily available and are very effective plasticizers. The lower molecular weight fatty acid amides such as lauramide are useful and effective but generally the longer linear aliphatic chains function more effectively. Unsaturated amides such as oleamide are effective and contemplated within the scope of the invention but generally are not as effective as their saturated counterparts.

The lower molecular weight simple aliphatic amides, such as butyramide, N-ethylacetamide and N,N-dimethylpropionamide are less preferred because of their higher water solubility.

Preferred organic ureas or thioureas for the practice of this invention are those with the general structure:

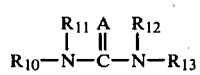

wherein A is selected from the group consisting of oxygen or sulfur, and $R_{10}$, $R_{11}$, $R_{12}$, and $R_{13}$ are H, $C_1$ to $C_{50}$ hydrocarbyl, preferably alkyl which can be the same or different are selected from the group consisting of aralkyl groups such as benzyl, aryl groups such as phenyl or tolyl, or alkyl groups such as octadecyl. It is preferred that one of the R groups be a $C_{12}$ to $C_{22}$ alkyl, more preferably $C_{16}$ to $C_{22}$ alkyl, and most preferably $C_{18}$ to $C_{22}$ alkyl and mixtures thereof. A preferred urea plasticizer is dibenzyl urea and preferred thioureas are 1,3-didodecyl-2-thiourea, and N,N′ di-p-tolylthiourea.

The organic urea or thiourea can be incorporated into the unplasticized gums in a number of ways. One means is the addition of the urea or thiourea to the cement of the sulfonated and neutralized polymer prior to its isolation during the manufacturing process. The resultant plasticized polymer can still have sufficiently high viscosity and integrity at the usual temperatures of drying so that it could be easily and conveniently dried in a tumble dryer or fluid bed dryer with hot air at for example 100° C. Yet the plasticized polymer can be made to possess sufficiently low viscosity so that it may be dewatered and dried in a dewatering extruder.

Organic urea or thiourea plasticizers can also be added to the gums through the solution of already isolated and dried unplasticized gums and the addition of the plasticizer to this solution. The resultant blend is isolated in the usual manner. Alternatively in cases where the unplasticized gums do not possess too high of a viscosity, it is possible to flux the gum and the organic urea or thiourea in a high intensity high shear mixers such as Banbury mixers and Farrell continuous mixers.

Particularly useful amines for the practice of this invention are preferably selected from saturated n-alkyl amines, wherein the alkyl group has at least about 16 carbon atoms; and mono and di-amino as well as aminoalkyl substituted naphthalene compounds and mixtures thereof. Preferred amine plasticizers are arachidylamine, behenylamine, 1,5-diaminonaphthalene and 8-amino-2-naphthol.

The amines can be incorporated into the unplasticized gums in a number of ways. One means is the addition of the amine to the cement of the sulfonated and neutralized polymer prior to its isolation during the manufacturing process. The resultant plasticized polymer can still have sufficiently high viscosity and integrity at the usual temperatures of drying so that it could be easily and conveniently dried in a tumble dryer or fluid bed dryer with hot air at for example 100° C. Yet the plasticized polymer can be made to possess sufficiently low viscosity so that it may be dewatered and dried in a dewatering extruder.

Amines can also be added to the gums through the solution of already isolated and dried unplasticized gums and the addition of the amine to this solution. The resultant blend is isolated in the usual manner. Alternatively in cases where the unplasticized gums do not possess too high of a viscosity, it is possible to flux the gum and the amine in high intensity high shear mixers such as a Banbury.

Liquid plasticizers are useful as flow improvers, but they are not preferred for maintaining the best tensile properties. In order to exhibit the substantial improvements in the melt processability while maintaining good mechanical properties at use temperatures, the plasticizers of the instant invention should be preferably solid at room temperature and more preferably possess melting points of 50° C. and higher, most preferably 70° C. or higher. Furthermore, it is preferred to incorporate these plasticizers into the neutralized ion containing polymer at about 1 to about 75 parts by weight per hundred of the polymer, more preferably at about 8 to about 50, and most preferably at about 10 to about 30.

Also contemplated within the scope of this invention as plasticizers are long chain aliphatic organic acids having about 12 to about 30 carbon atoms such as stearic acid and the corresponding metallic salts of the aforementioned long chain aliphatic organic acids.

The following examples more fully illustrate the invention and demonstrate the contribution to the art.

EXAMPLE I

Preparation of Quaternary Phosphonium Hydroxides

Two quaternary phosphonium hydroxides, prepared from the corresponding halides which were synthesized in accordance with the references and patent applications cited above, were prepared by the following method.

A percolation column having a height to diameter ratio of approximately 15:1 was packed with Amberlyst A-29, a commercially available anionic macroreticular ion-exchange resin marketed as the chloride salt by Rohm and Haas Co., Philadelphia, Pa. The resin was converted to the hydroxide form by slowly passing about 6.5 bed volumes of a 10 wt. % aqueous solution of reagent grade sodium hydroxide downwardly through the bed, followed by distilled water until the effluent had a pH of 7.0. The water in the column and in the resin was then displaced by percolating about 15 volumes of anhydrous methanol downwardly through the column.

The following quaternary phosphonium halides were converted to the hydroxide form in the following manner.

   1.

   2.

Both of the above quaternary phosphonium halides was dissolved in about 300 ml. of a solvent consisting of either anhydrous methanol or ethanol, or mixtures of these alcohols with either benzene or cyclohexane depending on the solubility characteristics of the particular halide. These solutions were percolated through a freshly prepared column of the hydroxide form of the ion exchange resin. The receiver for the percolated solution was blanketed with oxygen-free nitrogen, then sealed and refrigerated until used. Just before use an aliquot of each solution was titrated with standard alkali in order to check the basicity.

EXAMPLE 2

Polymer Sulfonic Acid

An EPDM available on a commercial scale (VISTALON) from Exxon Chemical Co., New York, N.Y., which comprised about 52 wt. % of ethylene, 43 wt. % of propylene and 5 wt. % of 5-ethylidene-2-norbornene and had a number average molecular weight of about 35,000 and a Mooney viscosity ML @ 100° C. (1+8 min.) of about 42, was sulfonated using acetyl sulfate in accordance with the method disclosed in U.S. Pat. No. 3,836,511. The product was stored at a temperature of −80° C. for future use.

EXAMPLE 3

Quaternary Phosphonium Salts of a Sulfonated EPDM

The sulfonated EPDM acid prepared in Example 2 was dissolved at room temperature at a concentration of 20 grams per liter in a mixed solvent consisting of 95% by volume of toluene and 5% by volume of anhydrous methanol. The solution was filtered to remove any gel particles and on titration of a sample of the filtered solution was found to have an acidity equal to 0.39 milli-equivalents of hydrogen per 100 ml. Aliquots of the solution were overbased with each of the quaternary phosphonium hydroxide solutions prepared in Example 1 by the addition of 1.2 equivalents of the quaternary phosphonium hydroxide per equivalent of sulfonic acid. The solutions were stirred under nitrogen at room temperature for about 10 minutes, checked to confirm the basicity of the solutions and they were made slightly acid by the addition of about 0.25 equivalents per equivalent of acidity originally present in the solution of a 2.5 wt. % solution of acetic acid in methanol.

The products were recovered by precipitation with about 10 volumes of methanol, followed by settling and decantation of the supernatant liquid.

Each of the recovered ionomers was overlaid with sufficient methanol to cover the product, 0.1% by weight (based on the weight of recovered product) of the phenolic antioxidant was added to each sample and after standing overnight the methanol was decanted and the products dried at room temperature in a vacuum oven for several days.

EXAMPLE 4

Plasticization of Quaternary Phosphonium Neutralized Sulfonated EPDM with an Amide Samples of the ionomers prepared in Example 3 were plasteiized with 60 milliequivalents of stearamide per 100 g of polymer (15.wt. percent) on an electrically heated two roll mill having 3″ diameter rolls. The mill was maintained between 122° C. and 132° C. during the incorporation of the additive, as measured with a surface pyrometer. The procedure was to first work the unplasticized ionomer on the mill for a minute or two in order to bring it up to temperature and cause it to fuse together into a coherent high viscosity melt. The plasticizer was incorporated into each polymer in three or four roughly equal portions to enable each polymer to take up the plasticizer without appreciable loss of additive and in order to maintain satisfactory mill behavior of the blend. For each of the two ionomer samples, immediately after the addition of the first portion of stearamide a marked softening and improved workability of each ionomer was observed, indicating that the additive was substantially plasticizing the ionomers. The further addition of stearamide to the ionomers was also accompanied by improved workability and softness of the polymer blends on the mill. For each of the two ionomers, about 10 to 10½ minutes after being first put on the hot mill, the specified amount of additive had been incorporated into the ionomer and the blend appeared to be uniform, so the material was removed from the mill. The temperature of the mill was checked both before and after the milling operation to insure that the appropriate mill temperatures were maintained.

In order to accurately determine the effect of the plasticizer incorporated into these quaternary phosphonium neutralized ionomers an unplasticized reference sample of each of the ionomers was prepared by heat treating and working them on the two roll mill in a manner which was as close as possible to the mill treatment of the samples being plasticized—including the same mill temperature and same milling time.

EXAMPLE 5

Melt Flow Rates of Stearamide Plasticized Sulfonated EPDM Neutralized with Quaternary Phosphonium Counterions The samples which were plasticized with 60 milliequivalents of stearamide per 100 g. of polymer in Example 4 were tested for melt flow rates on the melt index apparatus specified in ASTM 1238-70. The standard capillary was used, and the tests were run at 150° C. using a weight of 12.5 kilograms. Flow rates were measured electronically as probe displacement per minute and these results were converted to grams per 10 minutes using a conversion factor. The results are given in Table I. The unplasticized, mill-conditioned reference samples were also tested for comparison and their results are also included in Table I.

It is evident from Table I that stearamide causes a major improvement in the melt flow rate of quaternary phosphonium neutralized sulfonated EPDM's. In the case of the trioctyl methyl phosphonium counterion, 60 milliequivalents of stearamide per 100 g. of polymer increases the melt flow rate to well above one gram per 10 minutes at 150° C. This is an increase of more than a factor of ten in the melt flow rate from the unplasticized sample. The octadecyl trimethyl phosphonium neutralized sample exhibited an even greater improvement in melt flow rate of more than a factor of fifty.

The major increases in melt flow rate of these quaternary phosphonium neutralized ionomers which are caused by incorporation of an organic amide enables substantial improvements in the melt processing of these materials. For example, melt flow rates below around 0.1 g/10 minutes are rather low for extrusion applications; however, melt flow rates of around 1 g/10 minutes and above are in a range where extrusion processes can be useful. In any case, it is obvious that the major improvements in melt flow rate which are possible with the incorporation of long chain amides will greatly improve both the ease of melt fabrication and the economics of fabrication of quaternary phosphonium neutralized ionomers. In addition, the greater melt fluidity of these plasticized sulfonated elastomers makes them more satisfactory for use in hot melt sealants and adhesives.

TABLE I

Plasticization of Quaternary Phosphonium Neutralized Sulfonated EPDM's with Stearamide

| Structure of Counterion | Conc. of Stearamide (wt. %) | Melt Flow Rate[a] g/10 min. |
|---|---|---|
| $[(C_8H_{17})_3PCH_3]^+$ | 0 | 0.11 |
| $[(C_8H_{17})_3PCH_3]^+$ | 15.2 | 1.5 |
| $[C_{18}H_{37}P(CH_3)_3]^+$ | 0 | 0.014 |
| $[C_{18}H_{37}P(CH_3)_3]^+$ | 15.1 | 0.76 |

[a]Temperature of 150° C., weight of 12.5 kg.

EXAMPLE 6

Plasticization of a Quaternary Phosphonium Neutralized Sulfonated EPDM with an Amine.

A sample of the octadecyl trimethyl phosphonium neutralized sulfonated EPDM prepared in Example 3 was plasticized with 60 milliequivalents of octadecylamine per 100 g of polymer. This additive was incorporated into the polymer on a two roll mill. The procedure used for incorporating this amine was similar to the procedure described in Example 4—including the same range of mill temperatures and approximately the same milling time. Immediately after the first portion of octadecylamine was added to the ionomer on the mill a significant softening of the material was noted—indicating plasticization of the polymer by the additive. After incorporation of the specified amount of additive the blend appeared to be uniform and it was removed from the mill.

This plasticized sample was tested for melt flow rate in the manner described in Example 5. Results are shown below, including an unplasticized reference sample which had been given the same milling treatment as the sample plasticized with octadecylamine.

| Structure of Counterion | Conc. of Octadecylamine (wt. %) | Melt Flow Rate 150° C., 12.5 kgm (g/10 min.) |
|---|---|---|
| $[C_{18}H_{37}P(CH_3)_3]^+$ | 0 | 0.014 |
| $[C_{18}H_{37}P(CH_3)_3]^+$ | 14.4 | 0.12 |

This data shows that the incorporation of an organic amine into a quaternary phosphonium neutralized ionomer results in a substantial improvement in the melt flow rate. Although this improvement is not as great as for the stearamide plasticization described in Example 5, it is still quite significant, being almost a factor of ten. Such an improvement in melt flow rate will greatly facilitate the ease and speed of melt fabrication such as by compression molding or extrusion.

In common with elastomeric compositions, the ionomers of this invention may be compounded with a variety of other polymers, fillers, antioxidants and extenders.

Since quaternary phosphonium halides are readily synthesized from alkenes having terminal unsaturation, oligomers of ethylene, propylene and isobutylene, for example, having 100 or more carbon atoms may also be used to prepare the quaternary phosphonium cations.

What is claimed is:

1. A blend composition which comprises:
   (a) an ionomer having the general formula

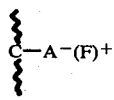

wherein C is one of a plurality of carbon atoms comprising a portion of the polymer backbone chain of carbon atoms or is in an acyclic, alicyclic or aromatic radical which is pendant to the backbone chain and wherein said ∽C∽ is (1) in a single polymer molecule, (2) in the same polymer molecule, (3) in different polymer molecules; A⁻ is one or more anionic acid radicals covalently bonded to one or more of said ∽C∽ carbon atoms; and (F)⁺ is selected from the group of quaternary phosphonium counterions consisting of compounds having the general formula:

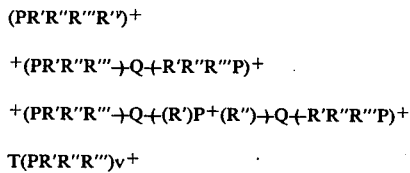

wherein R', R", R'" and R'ᵥ are independently selected from the group consisting of $C_1$ to $C_{50}$ straight and branched chain acyclic, alicyclic, aryl, alkylaryl and arylalkyl radicals and substituted functional derivatives thereof; Q is selected from the group consisting of $C_4$ to $C_{40}$ divalent straight and branched chain alkylene cycloalkylene, arylene, dialkylene arylene radicals and substituted functional derivatives thereof and —(CHY)$_n$—$Z_m$—(CHY)$_n$— wherein Z is a heteroatom selected from the group consisting of oxygen and sulfur; m is zero or one; Y is hydrogen or said $C_1$ to $C_{50}$ radicals and substituted functional derivatives of said radicals; n is an integer from 1 to 10; and v is the valency of a polyvalent hydrocarbon radical T, v being 3–10, and (b) less than about 75 parts by weight of a preferential plasticizer per 100 parts of said ionomer, said preferential plasticizer has the formula:

wherein L is a lipophilic moiety and H is a hydrophilic moiety, wherein a and b are whole numbers ranging from 1 to 4.

2. The composition of claim 1 wherein said A⁻ is one or more sulfonic acid groups (—SO$_3$⁻).

3. The composition of claim 1 wherein said polymer is selected from the group consisting of:
   a. Homopolymers and interpolymers of one or more acyclic and alicyclic mono-olefins;
   b. Homopolymers and interpolymers of one or more alkenyl aromatic hydrocarbon monomers;
   c. Interpolymers of one or more $C_4$ to $C_{10}$ conjugated diolefins with one or more $C_8$ to $C_{12}$ vinyl aromatic hydrocarbons;
   d. Interpolymers of one or more $C_4$ to $C_{10}$ vinyl aromatic hydrocarbons with one or more $C_4$ to $C_{10}$ Type III mono-olefins;
   e. Elastomeric interpolymers of one or more $C_4$ to $C_{10}$ conjugated diolefins with one or more $C_4$ to $C_{10}$ Type III mono-olefins;
   f. Homopolymers and interpolymers of one or more $C_{10}$ acyclic and alicyclic monoterpenes and $C_{15}$ sesquiterpenes;
   g. Homopolymers and interpolymers of one or more $C_4$ to $C_{10}$ conjugated diolefins; and
   h. Interpolymers of one or more $C_2$ to $C_{18}$ Type I mono-olefins and one or more $C_6$ to $C_{12}$ acyclic and alicyclic non-conjugated diolefins.

4. The composition of claim 1 wherein said polymer is a polyethylene and said anionic group is a sulfonic acid.

5. The composition of claim 1 wherein said polymer is a polypropylene and said anionic group is a sulfonic acid.

6. The composition of claim 1 wherein said polymer is an interpolymer of ethylene and propylene and said anionic group is a sulfonic acid.

7. The composition of claim 1 wherein said polymer is butyl rubber and said anionic group is a sulfonic acid, said butyl rubber comprising interpolymers of isobutylene with butadiene, isoprene, piperylene, 1,3-hexadiene, 2,3-dimethyl-1,3-butadiene and cyclopentadiene.

8. The composition of claim 1 wherein said polymer is an EPDM elastomer and said anionic group is a sulfonic acid.

9. The composition of claim 1 wherein said anionic group is a sulfonic acid covalently bonded to said C carbon atoms in an amount in the range of from about 0.2 to about 8 mole percent.

10. The composition of claim 1 wherein said ionomer is an elastomer.

11. The composition of claim 1 wherein said ionomer has a concentration of said anionic groups between about 0.2 to about 8.0 mole percent and said ionomer is water insoluble.

12. The composition of claim 1 wherein said polymer is a polyethylene.

13. The composition of claim 1 wherein said polymer is a polypropylene.

14. The composition of claim 1 wherein said polymer is an interpolymer of ethylene and propylene.

15. The composition of claim 1 wherein said polymer is an EPDM elastomer.

16. The composition of claim 1 wherein said polymer is a butyl rubber.

17. The composition according to claim 1 further including a filler.

18. The composition according to claim 1 further including an antioxidant.

19. The composition according to claim 1 further including another polymer.

20. The composition according to claim 1 further including an extender.

21. The composition of claim 1 wherein said plasticizer is selected from the group consisting of organic ureas, organic thioureas, organic amides, and organic amines.

22. The composition of claim 1 wherein said plasticizer is an organic amine.

23. The composition of claim 1 wherein said plasticizer is an organic amide.

24. A blend composition which comprises:
(a) an ionomer having the general formula $$C-A^-(F)^+$$

wherein C is an EPDM elastomer; $A^-$ is one or more sulfonic acid groups covalently bonded to said C carbon atoms in said EPDM elastomer in an amount in the range of from about 0.2 to about 8 mole percent wherein $[F]^-$ is selected from the group of quaternary phosphonium counterions consisting of compounds having the general formulae;

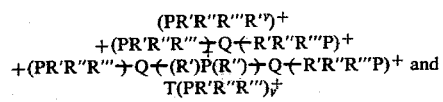

wherein $R'$, $R''$, $R'''$ and $R'^v$ are independently selected from the group consisting of $C_1$ to $C_{50}$ straight and branched chain acyclic, alicyclic, aryl, alkylaryl and arylalkyl radicals and substituted functional derivatives thereof; Q is selected from the group consisting of $C_4$ to $C_{40}$ divalent straight and branched chain alkylene, cycloalkylene, arylene, dialkylene arylene radicals and substituted functional derivatives thereof and $-(CHY_n-Z_m-(CHY)_n-$ wherein Z is a heteroatom selected from the group consisting of oxygen and sulfur; m is zero or one; Y is hydrogen or said $C_1$ to $C_{50}$ radicals and substituted functional derivatives of said radicals; n is an integer from 1 to 10; and v is the valency of a polyvalent hydrocarbon radical T, v being 3 to 10; and (b) less than about 75 parts by weight of a preferential plasticizer per 100 parts of said ionomer wherein said preferential plasticizer has the formula:

$$(L)_a(H)_b$$

wherein L is a lipophilic moiety and H is a hydrophilic moiety and a and b are integers ranging from 1 to 4.

25. The composition according to claim 24 further including a filler.

26. The composition according to claim 24 further including an antioxidant.

27. The composition according to claim 24 further including another polymer.

28. The composition according to claim 24 further including an extender.

29. The composition of claim 24 wherein said plasticizer is selected from the group consisting of organic ureas, organic thioureas, aliphatic organic amides, and organic amines.

30. The composition of claim 24 wherein said plasticizer is an organic amine.

31. The composition of claim 24 wherein said plasticizer is an aliphatic organic amide.

* * * * *